United States Patent
Meyers

(10) Patent No.: US 9,421,685 B2
(45) Date of Patent: Aug. 23, 2016

(54) TOOL BIT CASE

(71) Applicant: Milwaukee Electric Tool Corporation, Brookfield, WI (US)

(72) Inventor: Glenn Meyers, Greenfield, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 135 days.

(21) Appl. No.: 13/945,263

(22) Filed: Jul. 18, 2013

(65) Prior Publication Data

US 2014/0023475 A1  Jan. 23, 2014

Related U.S. Application Data

(60) Provisional application No. 61/672,929, filed on Jul. 18, 2012.

(51) Int. Cl.
*B25H 3/00* (2006.01)
*B25J 1/00* (2006.01)

(52) U.S. Cl.
CPC .............. *B25H 3/006* (2013.01); *B25H 3/003* (2013.01); *B25J 1/00* (2013.01)

(58) Field of Classification Search
CPC ........... B25H 3/003; B25H 3/006; B25J 1/00
USPC ........ 206/377, 376, 379, 372, 378; 211/70.6
See application file for complete search history.

(56) References Cited

U.S. PATENT DOCUMENTS

| | | | |
|---|---|---|---|
| 5,368,164 A * | 11/1994 | Bennett et al. | 206/373 |
| 6,415,923 B1 * | 7/2002 | Chen | 206/379 |
| 6,991,103 B2 * | 1/2006 | Chen | 206/373 |
| 7,021,464 B2 * | 4/2006 | Chen | 206/379 |
| 7,270,235 B2 * | 9/2007 | Chen | 206/379 |
| 7,331,455 B2 * | 2/2008 | Lin | 206/378 |
| 8,069,984 B2 | 12/2011 | Larson et al. | |
| 8,186,510 B1 * | 5/2012 | Chen | 206/375 |
| 8,196,742 B1 * | 6/2012 | Wang | 206/379 |
| 8,651,348 B2 * | 2/2014 | Meng | 224/245 |
| 2004/0084341 A1 * | 5/2004 | Amtenbrink | 206/372 |
| 2006/0016706 A1 * | 1/2006 | Chen | 206/379 |
| 2007/0235360 A1 * | 10/2007 | Lin | 206/373 |
| 2008/0035508 A1 | 2/2008 | Streich et al. | |
| 2008/0210593 A1 * | 9/2008 | Cornwell et al. | 206/747 |
| 2009/0242443 A1 * | 10/2009 | Chen | 206/375 |
| 2009/0266730 A1 * | 10/2009 | Lin | 206/372 |
| 2010/0200446 A1 | 8/2010 | Vasudeva | |
| 2011/0068032 A1 | 3/2011 | Meng | |

OTHER PUBLICATIONS

International Search Report and Written Opinion for Application No. PCT/US2013/051048 dated Nov. 26, 2013 (14 pages).

\* cited by examiner

*Primary Examiner* — Steven A. Reynolds
(74) *Attorney, Agent, or Firm* — Michael Best & Friedrich LLP

(57) ABSTRACT

A method of retrieving a tool bit from a tool bit case includes supporting the tool bit with a bit retainer of the tool bit case at an oblique angle relative to a bottom surface of the tool bit case so that a drive portion of the tool bit extends generally away from the bottom surface, engaging the drive portion of the tool bit with a driver while the tool bit is supported by the bit retainer, and removing the tool bit from the bit retainer by manipulating the driver.

11 Claims, 4 Drawing Sheets

TOOL BIT CASE

CROSS-REFERENCE TO RELATED APPLICATIONS

This application claims priority to U.S. Provisional Patent Application No. 61/672,929, filed Jul. 18, 2012 by Glenn Meyers and titled "TOOL BIT CASE," the entire contents of which are incorporated by reference herein.

BACKGROUND

The application relates to storage devices and, more particularly, to cases for storing tool bits.

Containers for storing tool bits such as drill bits, screwdriver bits, torque bits, and the like are known. Such containers typically include retaining means for holding the tool bits in an organized manner. Due to the relatively small sizes of the tool bits, however, it may sometimes be difficult for a user to grasp and remove the tool bits from the retaining means.

SUMMARY

In one embodiment, the invention provides a method of retrieving a tool bit from a tool bit case. The tool bit case includes a bottom surface and a bit retainer extending from the bottom surface. The method includes supporting the tool bit with the bit retainer at an oblique angle relative to the bottom surface of the tool bit case so that a drive portion of the tool bit extends generally away from the bottom surface, engaging the drive portion of the tool bit with a driver while the tool bit is supported by the bit retainer, and removing the tool bit from the bit retainer by manipulating the driver.

In another embodiment, the invention provides a tool bit storage system including a plurality of tool bits. Each tool bit includes a head and a drive portion. The tool bit storage system also includes a tool bit case having a bottom surface and a plurality of bit retainers extending from the bottom surface. Each bit retainer supports one of the plurality of tool bits at an oblique angle relative to the bottom surface so that the drive portion of the one of the plurality of tool bits extends generally away from the bottom surface and the head of the one of the plurality of tool bits extends generally toward the bottom surface.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1:
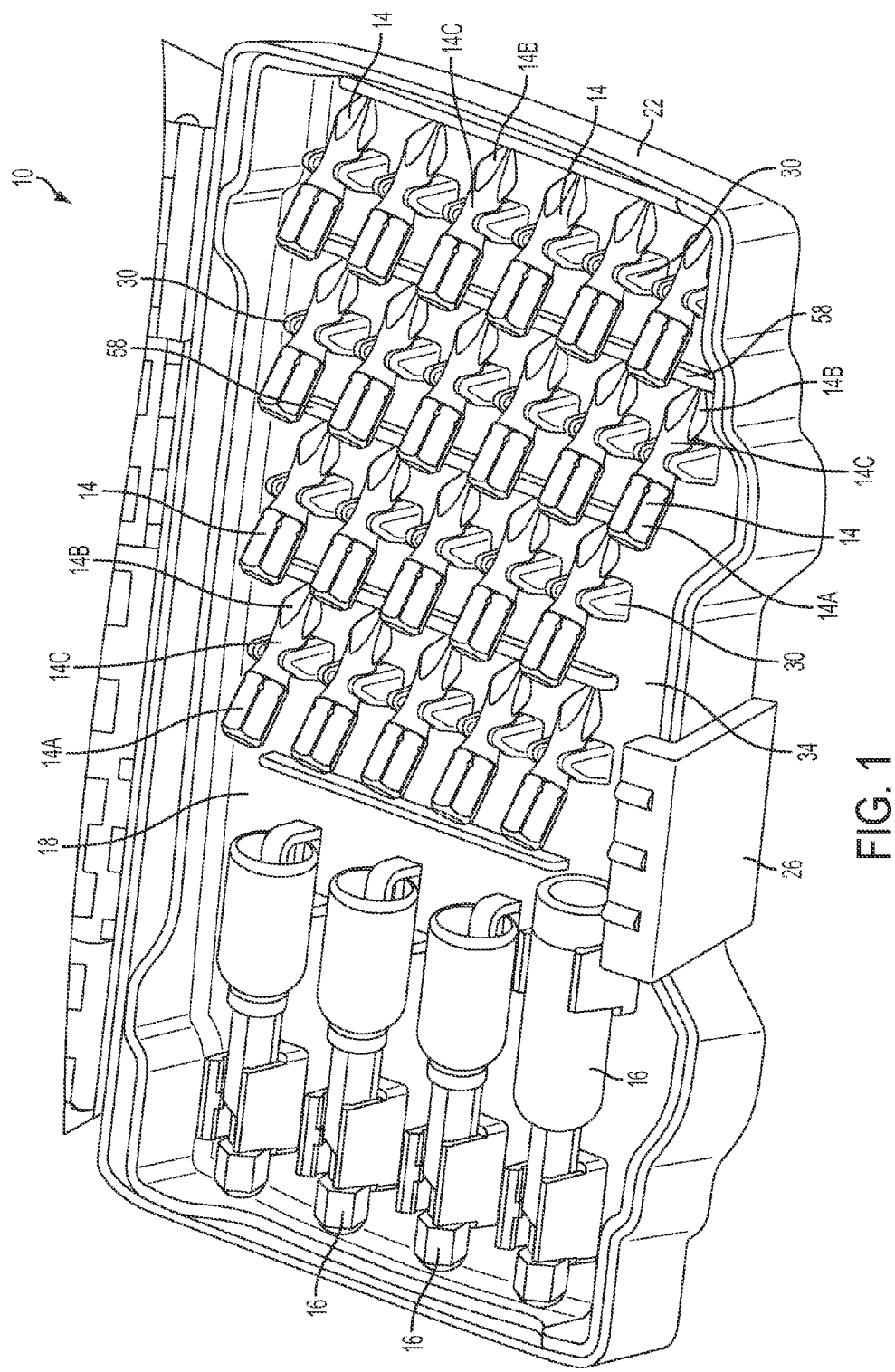
FIG. 1 is a top perspective view of a tool bit case containing a plurality of tool bits therein.

FIG. 1 illustrates a tool bit case 10 containing therein tool bits 14 for use with either a powered or a manual driver 16 (e.g., a drill or a ratcheting driver, respectively). Each tool bit 14 includes a drive portion 14A, a head 14B, and a shank 14C connecting the drive portion 14A to the head 14B. The drive portion 14A is configured to be engaged by each of the drivers 16 or other tool chucks to operate (e.g., drive, rotate, etc.) the tool bit 14. In the illustrated construction, the drive portions 14A of the tool bits 14 have generally hexagonal cross-sections. The heads 14B of the tool bits 14 are the working portions of the tool bits 14 and may include, for example, Phillips screwdriver heads, flat screwdriver heads, torque heads, and the like. The shank 14C of each tool bit 14 extends between the drive portion 14A and the head 14B. The illustrated shanks 14C are generally cylindrical and have outer diameters that are smaller than outer perimeters of the drive portions 14A and the heads 14B such that the shanks 14C are neck portions of the tool bits 14.

The tool bit case 10 includes a tray 18 and an outer case 22 in which the tray 18 is located. In the illustrated construction of the tool bit case 10, the outer case 22 includes a two-piece clamshell configuration with a latch 26 to maintain the outer case 22 closed. Alternatively, the outer case 22 may include any of a number of different configurations. As a further alternative, the tray 18 may be integrally formed with one of the pieces of the outer case 22.

Figure 2:
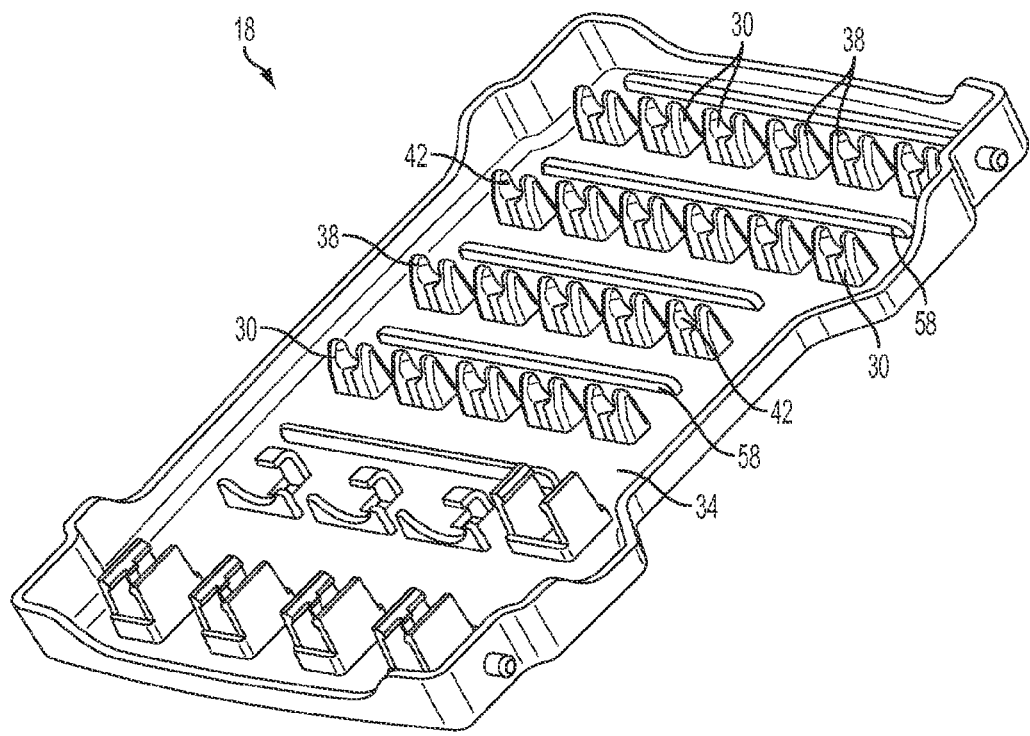
FIG. 2 is a top perspective view of a tray of the tool bit case of FIG. 1.

With reference to FIGS. 1 and 2, the tray 18 includes bit retainers 30 coupled to the tray 18. The illustrated bit retainers 30 extend upward from a bottom surface 34 of the tray 18 and are integrally formed with the tray 18 as a single piece. As such, the bit retainers 30 and the tray 18 are made of the same material (e.g., plastic). Alternatively, the bit retainers 30 may include an elastic covering (e.g., a rubber overmold) to facilitate holding the tool bits 14 therein.

Figure 3:
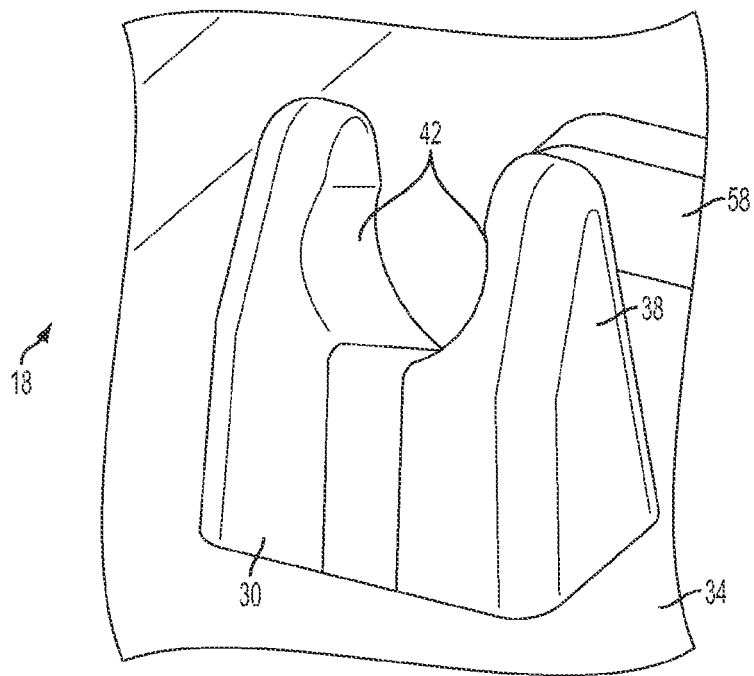
FIG. 3 is an enlarged, top perspective view of a portion of the tray of FIG. 2, illustrating a bit retainer.

With reference to FIG. 3, each bit retainer 30 includes a bit support portion 38 oriented at an oblique included angle A (FIG. 4) relative to the bottom surface 34 to support the tool bit 14 in an inclined orientation within the case 10. In the illustrated construction of the tool bit case 10, the bit support portion 38 of each of the bit retainers 30 includes two opposed, arcuate surfaces 42 for grasping the cylindrical shank 14C (FIG. 1) of each of the tool bits 14. In other words, the surfaces 42 coincide with a theoretical cylinder having a central axis 50 oriented at the included angle A. Alternatively, the bit support portion 38 may include any of a number of different shapes to facilitate grasping tool bits 14 having shanks with corresponding cross-sectional shapes.

Figure 4:
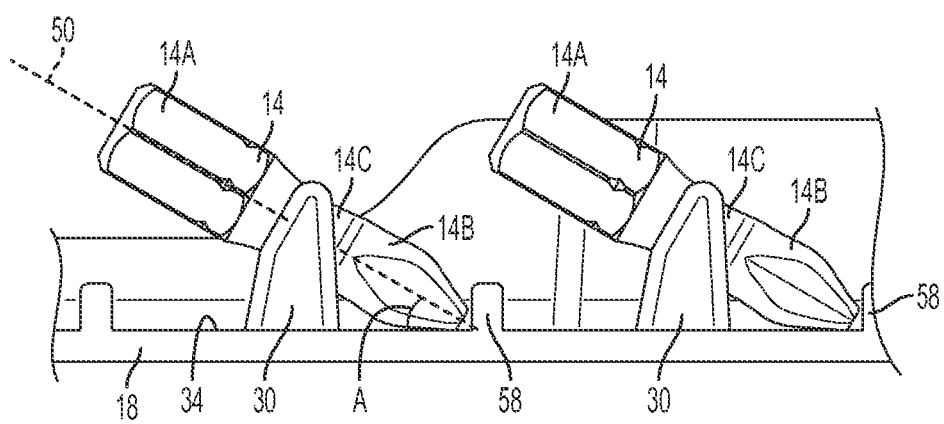
FIG. 4 is an enlarged side view of a portion of the tray of FIG. 2, illustrating two tool bits supported by two bit retainers on the tray, respectively.
Figure 5:
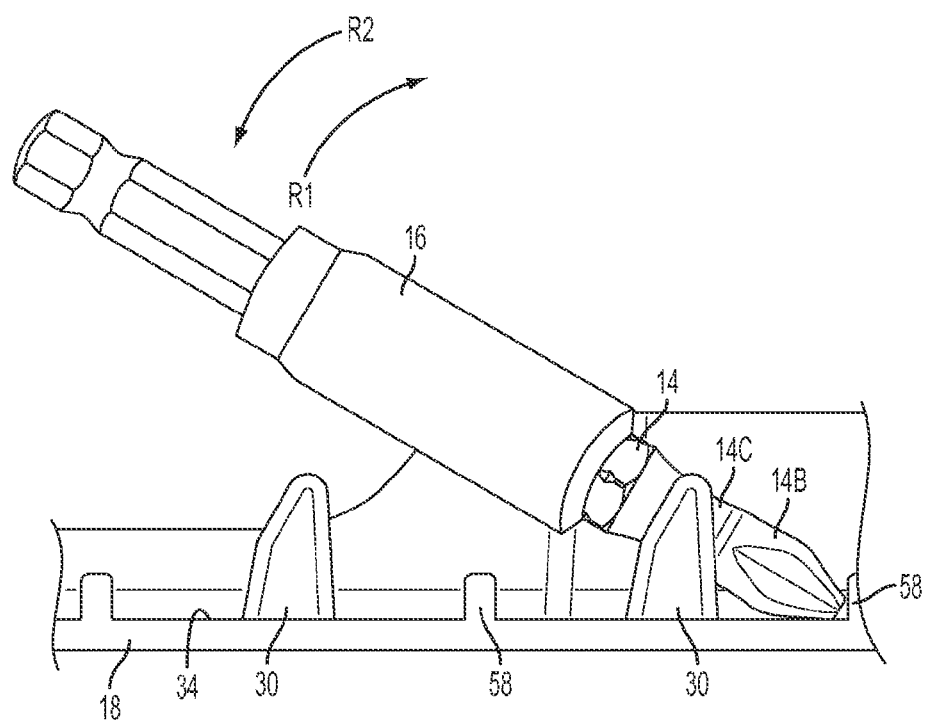
FIG. 5 is an enlarged side view of a portion of the tray of FIG. 2, illustrating a tool bit engaged by a driver while supported by a bit retainer on the tray.

As shown in FIG. 4, when the tool bits 14 are supported by the bit retainers 30, the tool bits 14 are likewise oriented at the oblique angle A relative to the bottom surface 18 of the tool bit case 10. In the illustrated construction, the oblique angle A is approximately 30 degrees such that the tool bits 14 are supported at an angle of approximately 30 degrees relative to the bottom surface 18. Alternatively, the oblique angle A may be between approximately 15 degrees and approximately 45 degrees such that the tool bits 14 are supported at an angle between approximately 15 degrees and approximately 45 degrees relative to the bottom surface 18.

Further, greater values of the oblique angle A may be utilized provided that the interior of the outer case 22 is sufficiently high to allow the outer case 22 to close when the tool bits 14 are supported at the oblique angle A.

In the illustrated construction, the tool bits 14 are supported by the bit retainers 30 so that the drive portions 14A of the tool bits 14 extend generally away from the bottom surface 18 and the heads 14B of the tool bits 14 extend generally toward the bottom surface 18. That is, the shank 14C of each tool bit 14 is engaged by the bit retainer 30 so that the drive portion 14A extends upwardly (albeit at the oblique angle A) and is spaced apart from the bottom surface 18, while the head 14B extends downwardly (albeit at the oblique angle A) and contacts the bottom surface 18. In addition, the tool bits 14 are positioned and aligned within the bit retainers 30 such that the theoretical central axis 50 of each bit retainer 30 also represents a central longitudinal axis of the corresponding tool bit 14.

With reference to FIGS. 1 and 2, the bit retainers 30 are arranged in multiple rows on the tray 18 such that corresponding bit retainers 30 in adjacent rows are arranged in line with each other to form a grid-type pattern. In the illustrated construction, the bit retainers 30 are arranged such that a user can access each of the tool bits 14 without interference from (e.g., contacting) any of the other tool bits 14. Alternatively, the bit retainers 30 in adjacent rows may be staggered from each other to allow greater access to the drive portions 14A of the respective tool bits 14 without interference from adjacent bits 14.

As shown in FIGS. 2 and 4, the tool bit case 10 includes a stop 58 associated with each of the bit retainers 30. The illustrated stops 58 are configured such that one stop 58 is associated with each row of bit retainers 30. Each stop 58 is engageable with the heads 14B of the tool bits 14 supported in the corresponding row of bit retainers 30. Particularly, the stops 58 extend in a direction parallel to the respective rows of bit retainers 30 such that each of the tool bits 14 in the respective bit retainers 30 for each row is engageable with the stop 58. In the illustrated construction of the tool bit case 10, the stops 58 are integrally formed with the tray 18 as a single piece and are defined as upstanding projections extending from the bottom surface 34. Alternatively, the stops 58 may be coupled to the tray 18 in any of a number of different manners, or omitted entirely. The stops 58 help limit movement of the tool bits 14 within the bit retainers 30. The stops 58 also define pivot points with the bottom surface 34 to facilitate inserting and removing the tool bits 14 from the bit retainers, as further discussed below.

When the tool bits 14 are stored within the tool bit case 10, a user may maneuver and manipulate one of the powered or manual drivers 16 (FIG. 1) to engage the hexagonal drive portion 14A of one of tool bits 14 and remove the tool bit 14 from its corresponding bit retainer 30 without first removing the tool bit 14 by hand for subsequent attachment to the driver 16. In particular, as shown in FIG. 3, since each tool bit 14 is supported by the corresponding bit retainer 30 at the oblique angle A, the drive portion 14A of the tool bit 14 is spaced apart from the bottom surface 34 of the tray 18 and easily accessible. As shown in FIG. 4, the user can slide the driver 16 onto the drive portion 14A of the tool bit 14 to engage the drive portion 14A while the tool bit 30 is still supported by the bit retainer 30. In the illustrated construction, the driver 16 includes a bore that is slid over an end of the drive portion 14A generally along the longitudinal axis 50 of the tool bit 14. In other embodiment, the driver 16 may include a slit or hook that snaps over the drive portion 14A from a direction generally perpendicular to the longitudinal axis 50 of the tool bit 14.

Once the driver 16 engages the tool bit 14, the driver 16 is manipulated to remove the tool bit 14 from the bit retainer 30. As shown in FIG. 4, the driver 16 can be rotated or pivoted in a first direction R1 away from the bottom surface 34 of the tray 18 to pivot the tool bit 14 out of the bit retainer 30. Because the head 14B of the tool bit 14 extends toward the bottom surface 34 of the tray 18 and engages the stop 58, the stop 58 limits the extent to which the tool bit 14 can slide within the bit retainer 30 while the tool bit 14 is being engaged by the driver 16. As such, the user may hold the tool bit case 10 with one hand while pushing the driver 16 onto the drive portion 14A with his or her other hand to thereby grasp the tool bit 14 without concern for the tool bit 14 sliding excessively in the bit retainer 30.

During removal, the head 14B of the tool bit 14 contacts the stop 58 and the bottom surface 34 to pivot about a point at the intersection of the stop 58 and the bottom surface 34. As the tool bit 14 is pivoted out of the bit retainer 30, the arcuate surfaces 42 of the bit retainer flex outwardly to release the cylindrical shank 14.

The user may also maneuver the powered or manual driver 16 to return the tool bit 14 to one of the bit retainers 30 without first removing the tool bit 14 from the driver 16 by hand and then placing the tool bit 14 within the bit retainer 30. In this manner, the stops 58 may be utilized as a pivot for engaging the head 62 of the tool bit 14 prior to lowering the tool bit 14 into the bit retainer 30. As shown in FIG. 4, the driver 16 can be rotated or pivoted in a second direction R2 toward the bottom surface 34 of the tray and generally opposite the first direction R1 to pivot the tool bit 14 into the bit retainer 30. After the tool bit 14 is grasped by the bit retainer 30, the driver 16 may be withdrawn from (e.g., slid off of) the drive portion 14A of the tool bit 14, thereby leaving the tool bit 14 behind in the bit retainer 30.

Although the invention has been described in detail with reference to certain preferred embodiments, variations and modifications exist within the scope and spirit of one or more independent aspects of the invention as described. Various features and advantages of the invention are set forth in the following claims.

The invention claimed is:

1. A method of retrieving a tool bit from a tool bit case, the tool bit case including a bottom surface and a bit retainer extending from the bottom surface, the bit retainer being fixed relative to the bottom surface, the method comprising:
   supporting the tool bit with the bit retainer at an oblique angle relative to the bottom surface of the tool bit case so that a drive portion of the tool bit extends generally away from the bottom surface;
   engaging the drive portion of the tool bit with a driver while the tool bit is supported by the bit retainer; and
   removing the tool bit from the bit retainer by manipulating the driver, wherein the bit retainer is immovably coupled to the bottom surface to hold the tool bit stationary until the tool bit is engaged by the driver.

2. The method of claim 1, wherein removing the tool bit from the bit retainer includes pivoting the tool bit and the driver away from the bottom surface of the tool bit case.

3. The method of claim 1, wherein supporting the tool bit with the bit retainer includes supporting the tool bit with the bit retainer at the oblique angle relative to the bottom surface of the tool bit case so that a head of the tool bit extends generally toward the bottom surface.

4. The method of claim 3, further comprising engaging a stop on the tool bit case with the head of the tool bit to limit sliding of the tool bit relative to the bit retainer.

5. The method of claim 4, wherein the stop is an upstanding projection extending from the bottom surface of the tool bit case.

6. The method of claim 1, wherein engaging the drive portion of the tool bit includes sliding the driver onto the drive portion of the tool bit while the tool bit is supported by the bit retainer.

7. The method of claim 1, wherein supporting the tool bit with the bit retainer at the oblique angle includes supporting the tool bit with the bit retainer at an angle between approximately 15 degrees and approximately 45 degrees relative to the bottom surface of the tool bit case.

8. The method of claim 1, wherein the tool bit case includes a plurality of bit retainers extending from the bottom surface and supporting a plurality of tool bits, and wherein removing the tool bit from the bit retainer includes removing the tool bit from the bit retainer without interference from other tool bits within the tool bit case.

9. The method of claim 1, wherein the bit retainer includes opposed arcuate surfaces, and wherein supporting the tool bit with the bit retainer includes grasping a cylindrical shank of the tool bit between the opposed arcuate surfaces.

10. The method of claim 9, wherein at least a portion of the bit retainer is made of resilient material, and wherein removing the tool bit from the bit retainer includes flexing the opposed arcuate surfaces away from each other to disengage the tool bit from the bit retainer.

11. The method of claim 6, wherein the tool bit has a central longitudinal axis, and wherein sliding the driver onto the drive portion of the tool bit includes sliding the driver onto the drive portion of the tool bit along the central longitudinal axis.

* * * * *